United States Patent
Pettit et al.

(10) Patent No.: US 12,514,442 B2
(45) Date of Patent: Jan. 6, 2026

(54) SELECTION OF A PREFERRED INTRAOCULAR LENS BASED ON RAY TRACING

(71) Applicant: Alcon Inc., Fribourg (CH)

(72) Inventors: George Hunter Pettit, Fort Worth, TX (US); Mark Andrew Zielke, Lake Forest, CA (US); John Alfred Campin, Southlake, TX (US); Martin Gründig, Rangsdorf (DE); Daniil Nekrassov, Berlin (DE)

(73) Assignee: ALCON INC., Fribourg (CH)

( * ) Notice: Subject to any disclaimer, the term of this patent is extended or adjusted under 35 U.S.C. 154(b) by 775 days.

(21) Appl. No.: 17/501,918

(22) Filed: Oct. 14, 2021

(65) Prior Publication Data

US 2022/0189608 A1 Jun. 16, 2022

Related U.S. Application Data

(60) Provisional application No. 63/124,333, filed on Dec. 11, 2020.

(51) Int. Cl.
*A61B 3/00* (2006.01)
*A61F 2/16* (2006.01)
(Continued)

(52) U.S. Cl.
CPC .............. *A61B 3/0025* (2013.01); *A61F 2/16* (2013.01); *G06T 15/06* (2013.01); *G16H 10/60* (2018.01);
(Continued)

(58) Field of Classification Search
CPC .......... G16H 20/40; A61F 2/16; G06T 15/06; A61B 3/0025
See application file for complete search history.

(56) References Cited

U.S. PATENT DOCUMENTS 8,746,882 B2 * 6/2014 Vidal .................. A61B 3/0025
351/205
2008/0306588 A1 * 12/2008 Smiley ................ A61F 2/1629
623/6.13
(Continued)

FOREIGN PATENT DOCUMENTS

JP 2017023473 A 2/2017

OTHER PUBLICATIONS

Carmen Canovas et al. Customized eye models for determining optimized intraocular lenses power. Biomed Opt Express. Jun. 1, 2011;2(6):1649-62. doi: 10.1364/BOE.2.001649. Epub May 20, 2011. PMID: 21698026; PMCID: PMC3114231. Viewed on May 18, 2024.*

(Continued)

*Primary Examiner* — James M Kish
*Assistant Examiner* — James Moss

(57) ABSTRACT

A system and method for selecting a preferred intraocular lens, for implantation into an eye, includes a controller having a processor and a tangible, non-transitory memory on which instructions are recorded. The controller is in communication with a diagnostic module adapted to store pre-operative anatomic data of the eye as an eye model. The controller is configured to determine respective imputed post-operative variables for each of a plurality of intraocular lenses, via a projection module. A respective pseudophakic eye model is generated for each of the plurality of intraocular lenses by incorporating the respective imputed post-operative variables into the eye model. A ray tracing module is executed in the respective pseudophakic eye model to determine at least one respective metric for the plurality of intraocular lenses. The preferred intraocular lens is selected based on a comparison of the respective metric.

16 Claims, 4 Drawing Sheets

(51) Int. Cl.
   *G06T 15/06* (2011.01)
   *G16H 10/60* (2018.01)
   *G16H 20/40* (2018.01)
   *G16H 50/20* (2018.01)
   *G16H 50/50* (2018.01)
   *G16H 50/70* (2018.01)
   *A61B 3/107* (2006.01)
   *A61B 3/11* (2006.01)

(52) U.S. Cl.
   CPC ............ *G16H 20/40* (2018.01); *G16H 50/20* (2018.01); *G16H 50/50* (2018.01); *G16H 50/70* (2018.01); *A61B 3/107* (2013.01); *A61B 3/112* (2013.01); *G06T 2210/41* (2013.01)

(56) References Cited

U.S. PATENT DOCUMENTS

| | | |
|---|---|---|
| 2012/0044454 A1 | 2/2012 | Canovas et al. |
| 2012/0069298 A1* | 3/2012 | Ng .......................... A61B 3/18 351/205 |
| 2015/0087743 A1* | 3/2015 | Anvar ....................... C07F 7/20 523/106 |
| 2015/0131054 A1* | 5/2015 | Wuellner ............. A61B 3/1005 351/205 |
| 2017/0316571 A1* | 11/2017 | Martínez-Enríquez ...................... A61B 3/0025 |
| 2018/0368970 A1* | 12/2018 | Findl ......................... A61F 2/16 |
| 2020/0113433 A1 | 4/2020 | Neal et al. |
| 2020/0229870 A1 | 7/2020 | Sarangapani et al. |
| 2021/0279939 A1* | 9/2021 | State ....................... A61F 2/164 |

OTHER PUBLICATIONS

Pérez-Merino P, Aramberri J, Quintero AV, Rozema JJ. Ray tracing optimization: a new method for intraocular lens power calculation in regular and irregular corneas. Sci Rep. Mar. 20, 2023;13(1):4555. doi: 10.1038/s41598-023-31525-8. PMID: 36941337; PMCID: PMC10027892.*

* cited by examiner

SELECTION OF A PREFERRED INTRAOCULAR LENS BASED ON RAY TRACING

INTRODUCTION

The disclosure relates generally to a system and method of selecting an intraocular lens for implantation in an eye. More specifically, the disclosure pertains to selecting a preferred intraocular lens from a plurality of intraocular lenses based on ray tracing. The human lens is generally transparent such that light may travel through it with ease. However, many factors may cause areas in the lens to become cloudy and dense, and thus negatively impact vision quality. The situation may be remedied via a cataract procedure, whereby an artificial lens is selected for implantation into a patient's eye. Indeed, cataract surgery is commonly performed all around the world. With different types of intraocular lenses available today, both in terms of model (e.g., multifocal intraocular lenses correcting different ranges of vision) and power, it is not always clear what the optimal selection for a specific patient may be. Furthermore, power calculation formulas for intraocular lenses currently employ limited pre-operative diagnostic information and relatively simple optical analyses to recommend intraocular implant prescriptions.

SUMMARY

Disclosed herein is a system and method for selecting a preferred intraocular lens for implantation into an eye of a subject. The system includes a controller having a processor and a tangible, non-transitory memory on which instructions are recorded. The controller is in communication with a diagnostic module adapted to store pre-operative anatomic data of the eye as an eye model. The system includes a projection module and a ray tracing module selectively executable by the controller. The projection module is adapted to determine respective imputed post-operative variables of the eye based in part on the pre-operative anatomic data. The ray tracing module is adapted to calculate propagation of light through the eye.

The controller is configured to determine the respective imputed post-operative variables for each of a plurality of intraocular lenses, via the projection module. A respective pseudophakic eye model is generated for each of the plurality of intraocular lenses by incorporating the respective imputed post-operative variables into the eye model. The controller is configured to execute the ray tracing module in the respective pseudophakic eye model to determine at least one respective metric for the plurality of intraocular lenses. The preferred intraocular lens is selected from the plurality of intraocular lenses based at least partially on a comparison of the at least one respective metric. The respective metric may be a point spread function. The respective metric may be a modulation transfer function.

In some embodiments, executing the ray tracing module includes propagating a bundle of rays posteriorly through the eye until the bundle of rays reach a spot on a retina, the bundle of rays being parallel to an optical axis of the eye prior to entering the eye from an anterior corneal surface. Here, the respective metric may be based on a spatial distribution of the bundle of rays at the spot on the retina. The ray tracing module may be adapted to employ respective refractive indices in the eye applicable to a wavelength of 550 nanometers of light. The ray tracing module may be adapted to employ respective refractive indices in the eye applicable to multiple wavelengths spanning a visible portion of the spectrum.

In some embodiments, executing the ray tracing module includes originating a bundle of rays at a spot on a fovea of the eye with a specific divergence that sufficiently illuminates the pupil and propagating the bundle of rays anteriorly through the eye until the bundle of rays exit an anterior corneal surface. Here, the respective metric may be based on a spatial distribution of the bundle of rays after exiting the anterior corneal surface.

The pre-operative anatomic data may include an axial length of the eye. The pre-operative anatomic data may include a respective location and a respective profile of an anterior corneal surface and a posterior corneal surface of the eye. The pre-operative anatomic data includes a location, an orientation, and a size of a pupil of the eye in a three-dimensional coordinate system, the pupil being under photopic conditions. The respective imputed post-operative variables of the eye may include a respective location and a respective orientation of the plurality of intraocular lenses. The respective imputed post-operative variables may include a respective location and a respective orientation of at least one of a pupil and iris.

Disclosed herein is a method of selecting a preferred intraocular lens for implantation in an eye, with a system having a controller with a processor and a tangible, non-transitory memory on which instructions are recorded. The method includes obtaining pre-operative anatomic data of the eye and storing the pre-operative anatomic data as an eye model, via a diagnostic module. Respective imputed post-operative variables are determined for each of a plurality of intraocular lenses based in part on the pre-operative anatomic data, via a projection module.

The method includes generating a respective pseudophakic eye model for each of the plurality of intraocular lenses by incorporating the respective imputed post-operative variables into the eye model, via the controller. A ray tracing module is adapted to calculate a propagation of light through the eye, the ray tracing module being selectively executable by the controller. The method includes executing the ray tracing module in the respective pseudophakic eye model to determine at least one respective metric for the plurality of intraocular lenses. The preferred intraocular lens is selected from the plurality of intraocular lenses based at least partially on a comparison of the at least one respective metric.

The above features and advantages and other features and advantages of the present disclosure are readily apparent from the following detailed description of the best modes for carrying out the disclosure when taken in connection with the accompanying drawings.

DETAILED DESCRIPTION

Figure 1:
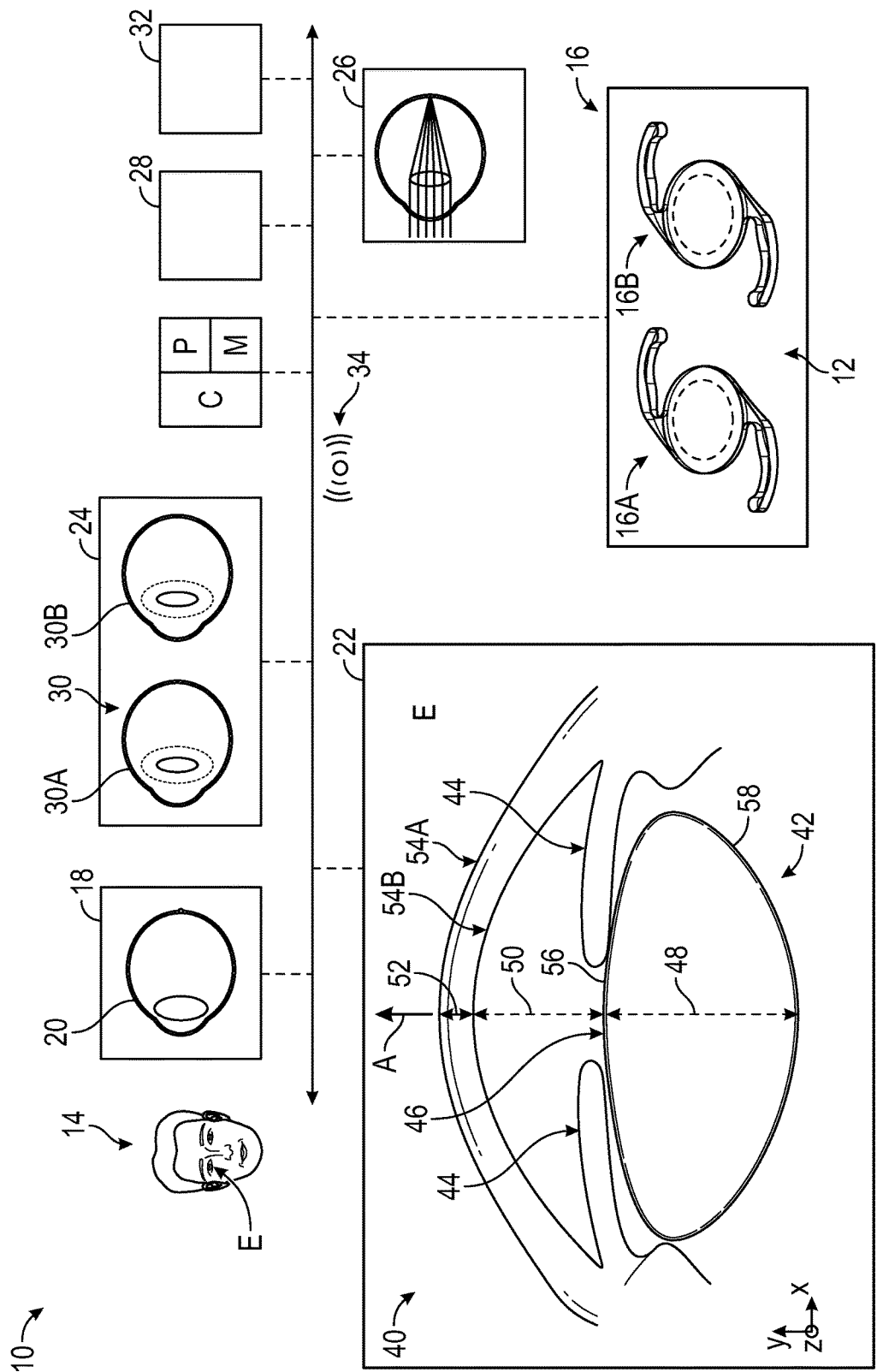
FIG. 1 is a schematic illustration of a system for selecting a preferred intraocular lens for implantation into an eye, the system having a controller and a ray tracing module.

Referring to the drawings, wherein like reference numbers refer to like components, FIG. 1 schematically illustrates a system 10 for selecting a preferred intraocular lens 12 for implantation in an eye E of a subject 14. The preferred intraocular lens 12 is selected from a plurality of intraocular lenses 16. Referring to FIG. 1, the system 10 includes a controller C having at least one processor P and at least one memory M (or non-transitory, tangible computer readable storage medium) on which instructions are recorded for executing a method 100 for selecting the preferred intraocular lens 12. Method 100 is shown in and described below with reference to FIG. 2.

Referring to FIG. 1, the system 10 includes a diagnostic module 18 adapted to store pre-operative anatomic data of the eye E, stored as an eye model 20. The pre-operative anatomic data may be obtained from at least one imaging device 22. The system 10 may include a projection module 24 and a ray tracing module 26 selectively executable by the controller C. The projection module 24 is adapted to predict post-operative anatomic parameters of the eye E based at least partially on the pre-operative anatomic data. The ray tracing module 26 is adapted to calculate propagation of light through the eye E.

Referring to FIG. 1, the system 10 includes a lens selection module 28 that receives the output of the ray tracing module 26 for a set of intraocular lenses for investigation, i.e., the plurality of intraocular lenses 16. This information allows the clinician to select the best model and/or power to optimize visual performance. As an overview, the system 10 inputs pre-operative anatomic data of an eye E about to undergo cataract surgery and determines respective imputed post-operative variables for each of the plurality of intraocular lenses 16, via the projection module 24. The respective imputed post-operative variables include post-operative location and orientation of each of the plurality of intraocular lenses 16 and the iris/pupil complex.

Referring to FIG. 1, the respective imputed post-operative variables are incorporated into the eye model 20 to generate a respective pseudophakic eye model 30 for each of the plurality of intraocular lenses 16. The controller C is configured to execute the ray tracing module 26 to determine at least one respective metric for the respective pseudophakic eye model 30. The ray tracing module 26 provides an assessment of the focusing properties of the pseudophakic eye. The preferred intraocular lens 12 is selected from the plurality of intraocular lenses 16 based at least partially on a comparison of the at least one respective metric ("at least one" omitted henceforth). The system 10 provides the technical advantage of more accurately predicting retinal focus to match the anatomy of the pseudophakic eye and leading to a better selection from the plurality of intraocular lenses 16.

Referring to FIG. 1, the system 10 may include a user interface 32 operable by a user. The user interface 32 may include a touchscreen or other input device. The controller C may be configured to process signals to and from the user interface 32 and a display (not shown).

The various components of the system 10 may be configured to communicate via a network 34, shown in FIG. 1. The diagnostic module 18, projection module 24, ray tracing module 26 and lens selection module 28 may be embedded in the controller C. Alternatively, the diagnostic module 18, projection module 24, ray tracing module 26 and lens selection module 28 may be a part of a remote server or cloud unit accessible to the controller C via the network 34. The network 34 may be a bi-directional bus implemented in various ways, such as for example, a serial communication bus in the form of a local area network. The local area network may include, but is not limited to, a Controller Area Network (CAN), a Controller Area Network with Flexible Data Rate (CAN-FD), Ethernet, WIFI, Bluetooth™ and other forms of data connection. Other types of connections may be employed.

Figure 2:
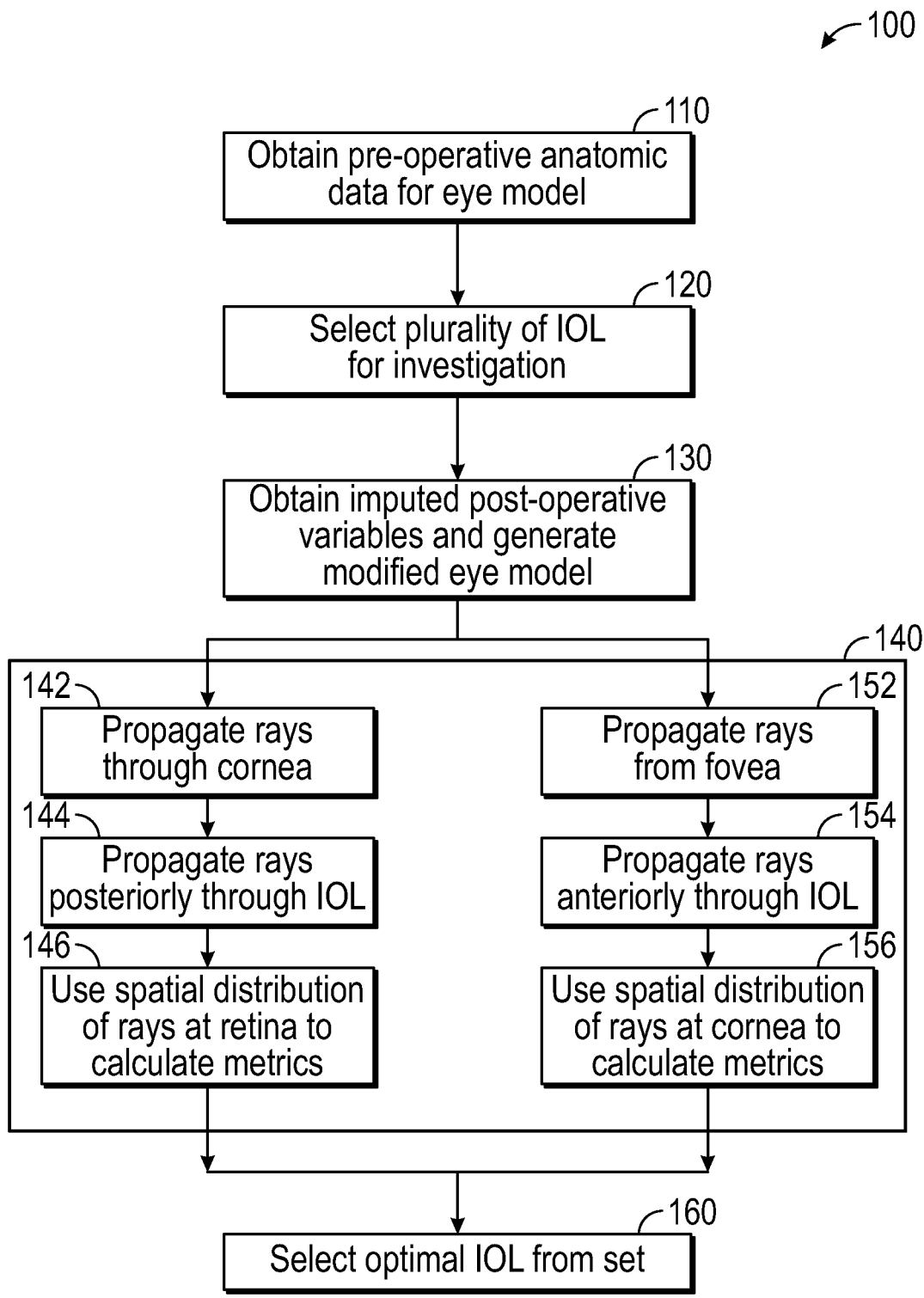
FIG. 2 is a schematic flowchart for a method executable by the controller of FIG. 1.

Referring now to FIG. 2, a flow chart of the method 100 for selecting the preferred intraocular lens 12 is shown. Method 100 may be fully or partially executable by the controller C of FIG. 1. Method 100 need not be applied in the specific order recited herein. Additionally, it is understood that some blocks may be omitted. The method 100 begins at block 110.

Per block 110 of FIG. 2, the controller C is configured to obtain pre-operative anatomic data of the eye E, which is stored as part of the eye model 20 in a diagnostic module 18. The pre-operative anatomic data may include biometric data and may be obtained from at least one imaging device 22. The imaging device 22 may be a topography device, an ultrasound machine, optical coherence tomography machine, a magnetic resonance imaging machine or other imaging device available to those skilled in the art. The pre-operative anatomic data may be derived from a single image or from multiple images.

An example of a pre-operative image 40 is shown in FIG. 1. The pre-operative image 40 may be obtained via an ultrasound bio-microscopy technique. The ultrasound bio-microscopy technique may employ a relatively high frequency transducer of between about 35 MHz and 100 MHz, with a depth of tissue penetration between about 4 mm and 5 mm. Referring to FIG. 1, the pre-operative anatomic data includes a respective position and respective orientation of the natural lens 42 and iris 44. The orientation includes a tilt relative to an XYZ coordinate system. The pre-operative anatomic data includes the position, orientation and size of the pupil 46 under photopic conditions. Photopic conditions refer to vision under well-lit conditions, which functions primarily due to cone cells in the eye. In some embodiments, photopic conditions may be defined to cover adaptation levels of 3 candelas per square meter ($cd/m^2$) and higher.

Referring to FIG. 1, the respective positions of the natural lens 42, iris 44 and pupil 46 may be specified in three dimensions in an XYZ coordinate system; along the X axis as well as along the Y axis and Z axis. The XYZ coordinate system may be defined such that the X axis is parallel to the visual axis A. Alternatively, the XYZ coordinate system may be defined such that the X axis is parallel to another geometrical or optical axis (not shown). Here, the eye model 20 would include the position and orientation of the visual axis A.

The eye model 20 may be considered as a three-dimensional model of a pre-operative or phakic (containing the natural lens) eye defined by a plurality of parameters $P_1 \ldots P_N$ (representing the pre-operative anatomic data). Referring to FIG. 1, the plurality of parameters (or pre-operative anatomic data) may include lens thickness 48, anterior chamber depth 50 and corneal thickness 52. In addition, the eye model 20 in the diagnostic module 18 contains the refractive indices of the different portions of the eye E. The diagnostic module 18 may be selectively executable to approximate or parametrize surfaces in the eye E based on the pre-operative anatomic data and algorithms available to those skilled in the art. The eye model 20 of FIG. 1 may include the shape and location of the anterior corneal surface 54A and the posterior corneal surface 54B. The eye model 20 may further include the shape and location of the anterior lens surface 56 and the posterior lens surface 58. The pre-operative anatomic data may include an axial length L (shown in FIGS. 3-4) of the eye E. The eye model 20 may approximate the surface of the retina 60 (shown in FIG. 2) from the axial length 58 as the ocular globe typically has a near spherical shape.

The method 100 proceeds to block 120, where the controller C is configured to select a plurality of intraocular lenses 16 (see FIG. 1) to be investigated for implantation into the subject 14. The plurality of intraocular lenses 16 may include a first IOL 16A and a second IOL 16B, which may be mono-focal or multifocal lenses of varying powers. In some embodiments, the first IOL 16A is configured to provide better vision in a first distance range and the second IOL 16B is configured to provide better vision in a second distance range. Alternatively, first IOL 16A may be an accommodating lens with a fluid-filled internal cavity, the fluid being movable in order to vary a thickness (and power) of the first IOL 16A. It is to be understood that the plurality of intraocular lenses 16 may take many different forms and include multiple and/or alternate components.

The method 100 proceeds to block 130 from block 120. Per block 130 of FIG. 2, the method 100 includes determining respective imputed post-operative variables of the eye E for each of the plurality of intraocular lenses 16, via the projection module 24. In order to reflect the anatomy of the post-operative or pseudophakic eye, the respective imputed post-operative variables are incorporated into the eye model 20, thereby generating a respective pseudophakic eye model 30 (see FIG. 1) for each of the plurality of intraocular lenses 16. In other words, the measured parameters of the natural lens 42, iris 44 and pupil 46 in the eye model 20 are replaced with the corresponding predicted parameters for the pseudophakic eye in order to form the respective pseudophakic eye model 30. For example, referring to FIG. 1, a first pseudophakic eye model 30A is generated for the first IOL 16A. A second pseudophakic eye model 30B is generated for the second IOL 16B.

Figure 3:
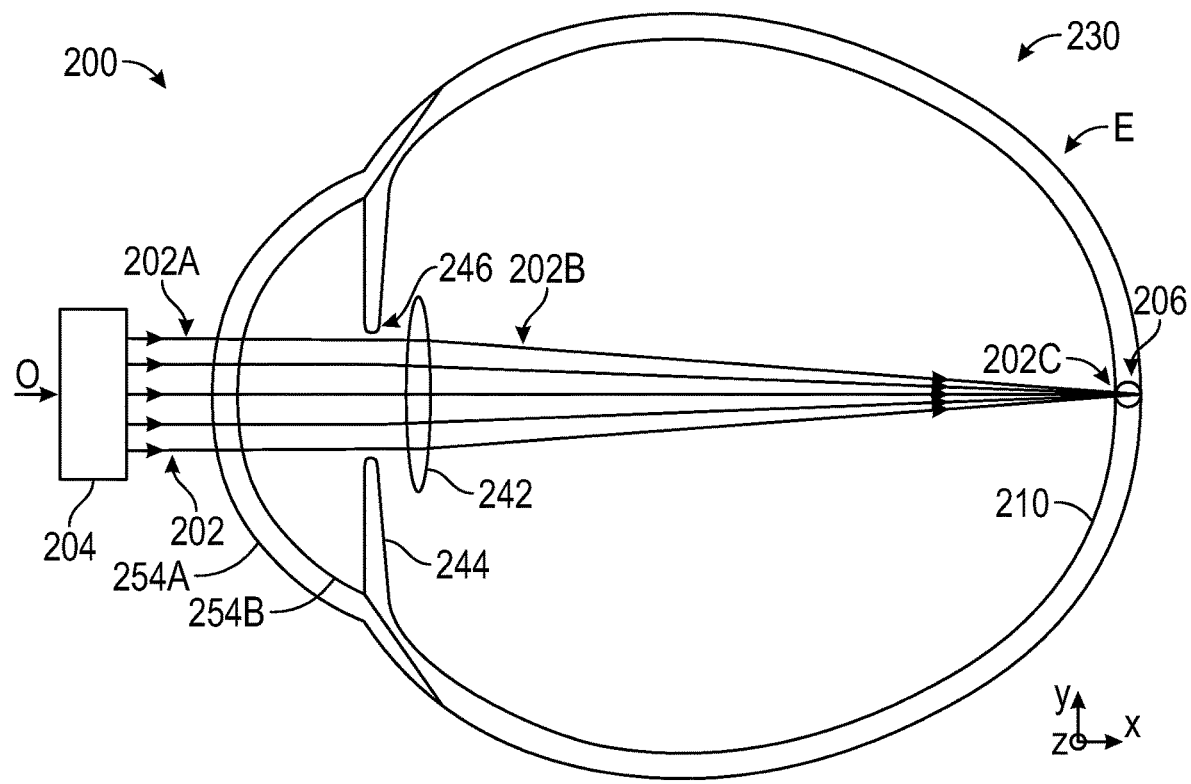
FIG. 3 is a schematic diagram illustrating an example implementation of the ray tracing module of FIG. 1, in accordance with a first embodiment.

The imputed post-operative variables are based in part on the pre-operative anatomic data and the characteristics of the plurality of intraocular lenses 16. An example of a pseudophakic eye model 230 is shown in FIG. 3. Post-operatively, a pupil 246 (see FIG. 3) may be decentered or tilted with respect to the visual axis A (see FIG. 1). In the pre-operative image 40 shown in FIG. 1, the iris 44 may be bulging and shifted anteriorly due to the relatively bulkier shape of a natural lens 42. Post-operatively, the iris 244 (see FIG. 3) may assume a relatively more planar geometry.

Figure 4:
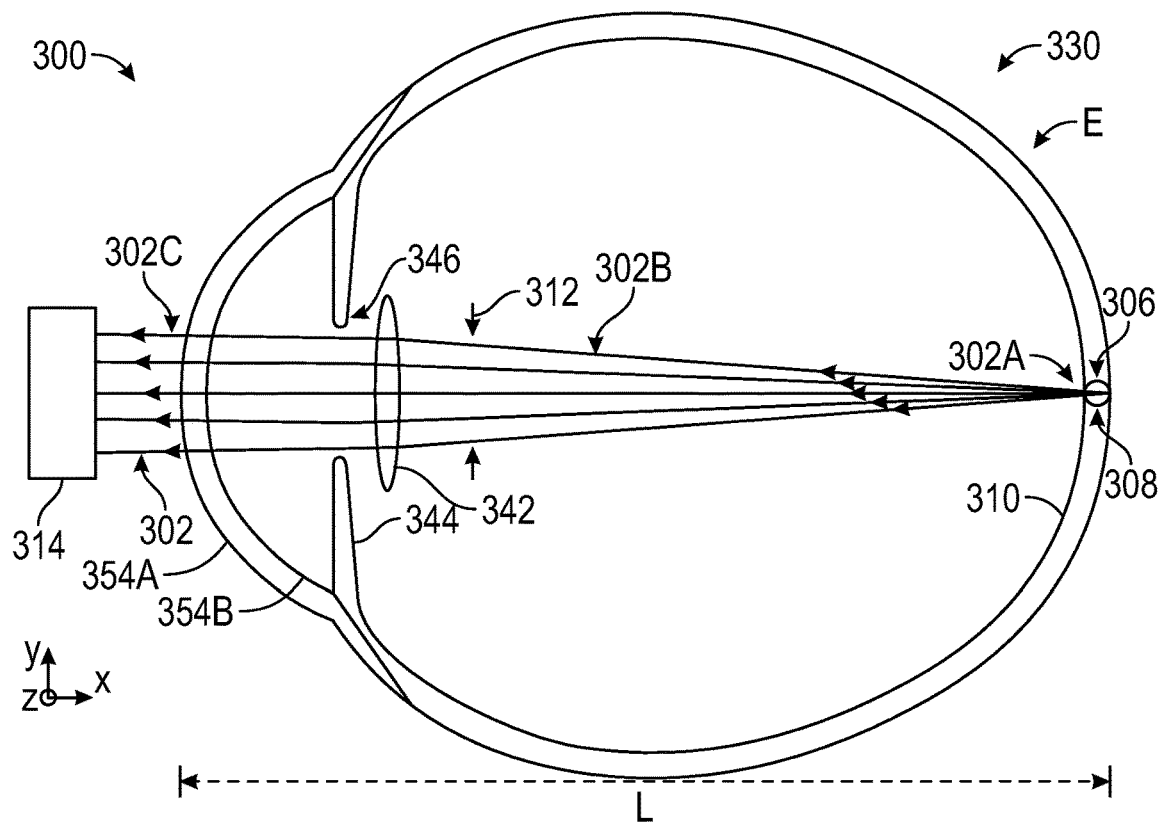
FIG. 4 is a schematic diagram illustrating an example implementation of the ray tracing module of FIG. 1, in accordance with a second embodiment.

Referring to FIG. 4, the imputed post-operative variables include a respective location and a respective orientation or tilt (relative to the XYZ coordinate system) of the intraocular lens 242, the pupil 246 and/or the iris 244. The projection module 24 may be adapted to use the measured parameters $P_1 \ldots P_N$ (from block 110) to predict the position and tilt of each of the plurality of intraocular lenses 16 using a first function $f(P_1 \ldots P_N)$. The projection module 24 may be configured to predict pupil position/tilt and iris position/tilt in the pseudophakic eye using a second function $g(P_1 \ldots P_N)$ and a third function $h(P_1 \ldots P_N)$, respectively. In some embodiments, the first function $f(P_1 \ldots P_N)$, second function $g(P_1 \ldots P_N)$ and third function $h(P_1 \ldots P_N)$ are based on intraocular lens power calculation formula available to those skilled in the art. Examples of such formulas include the SRK/T formula, the Holladay formula, the Hoffer Q formula, the Olsen formula and the Haigis formula.

In some embodiments, the projection module 24 incorporates a machine learning module, such as a neural network, which is trained to determine the imputed post-operative variables through a training dataset of historical pairs of pre-operative data and post-operative data. Historical pairs refers to pre-operative data and post-operative data of the same person. The system 10 may be configured to be "adaptive" and updated periodically with a larger training set. It is understood that the imputed post-operative variables may be obtained from other estimation methods available to those skilled in the art.

The method 100 proceeds to block 140 from block 130, where the controller C is configured to execute the ray tracing module 26 to determine a respective metric for the respective pseudophakic eye model 30. The ray tracing module 26 provides an assessment of the focusing properties of the pseudophakic eye. The propagation of light through the eye E may be traced through reflection and refraction using Snell's law, which describes the refraction of a ray at a surface separating two media with different refractive indices. In other words, as a respective ray in a bundle of rays encounters a surface, the new direction of the respective ray is determined in accordance with Snell's law using the refractive indices stored in the diagnostic module 18. In some embodiments, the ray tracing module 26 employs refractive indices applicable to 550 nanometers wavelength of light (green light). In other embodiments, the ray tracing module 26 employs refractive indices applicable to a multitude of wavelengths. This helps to account for chromatic dispersion effects, for example, between a diagnostic measurement wavelength and different wavelengths of importance to human vision, or between multiple visible wavelengths to assess the impact of chromatic aberration on retinal image quality and other factors.

In accordance with a first embodiment, an example first implementation 200 of the ray tracing module 26 is shown in FIG. 3. FIG. 3 shows a bundle of rays 202 propagating through a pseudophakic eye model 230. The first implementation 200 is described with reference to sub-blocks 142, 144, 146 (of block 140) of FIG. 2.

Per sub-block 142, the ray tracing module 26 (of FIG. 1) is adapted to trace or propagate a bundle of rays 202 through a pseudophakic eye model 230. The bundle of rays 202 are parallel to the optical axis O of the eye E. The bundle of rays 202 may be simulated to emanate from a source 204 of light having a wavelength of 550 nanometers, for example. A first portion 202A of the bundle of rays 202 propagates through the anterior corneal surface 254A and the posterior corneal surface 254B.

Per sub-block 144, the bundle of rays 202 of FIG. 3 are propagated posteriorly through the intraocular lens 242 (see second portion 202B) until reaching a spot 206 on the retina 210 (see third portion 202C). The spatial distribution of the bundle of rays 202 at the spot 206 is recorded. The ray tracing may be repeated for different diameters of the pupil 246.

Figure 5:
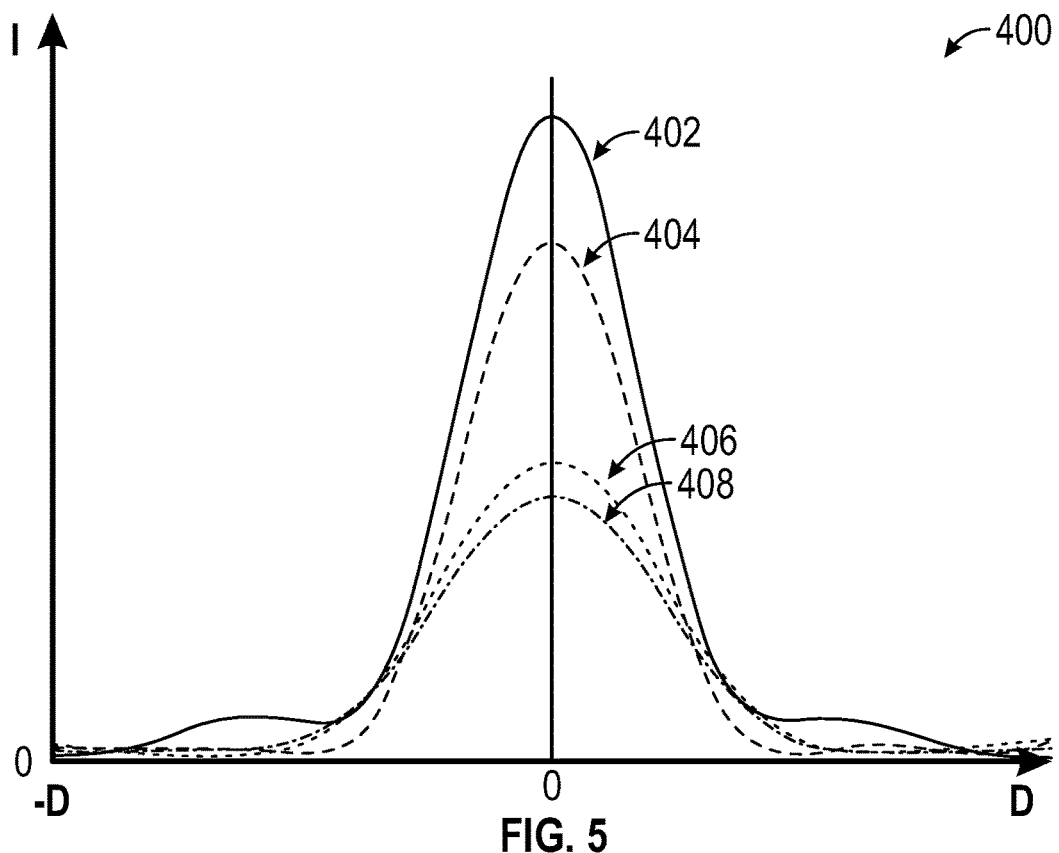
FIG. 5 is a schematic diagram of respective point spread function graphs for a plurality of intraocular lenses.

Per sub-block 146, the spatial distribution of the bundle of rays 202 at the spot 206 on the retina 210 is used to derive a respective metric. The respective metric may be a single parameter of interest or a distribution of values. The respective metric may include, but is not limited to, a wavefront distribution, a modulation transfer function (MTF) and a point spread function (PSF). An example of a set 400 of point spread function graphs is schematically shown in FIG. 5. Referring to FIG. 5, traces 402, 404, 406 and 408 respectively illustrate point spread functions obtained for four different intraocular lenses. The size of the pupil 246 (or pupil 346 in FIG. 4) in set 400 is about 5 mm. The vertical axis in FIG. 5 represents intensity while the horizontal axis represents distance D (positive and negative) on either side of a reference point corresponding to the spot 206 on the retina 210.

Figure 6:
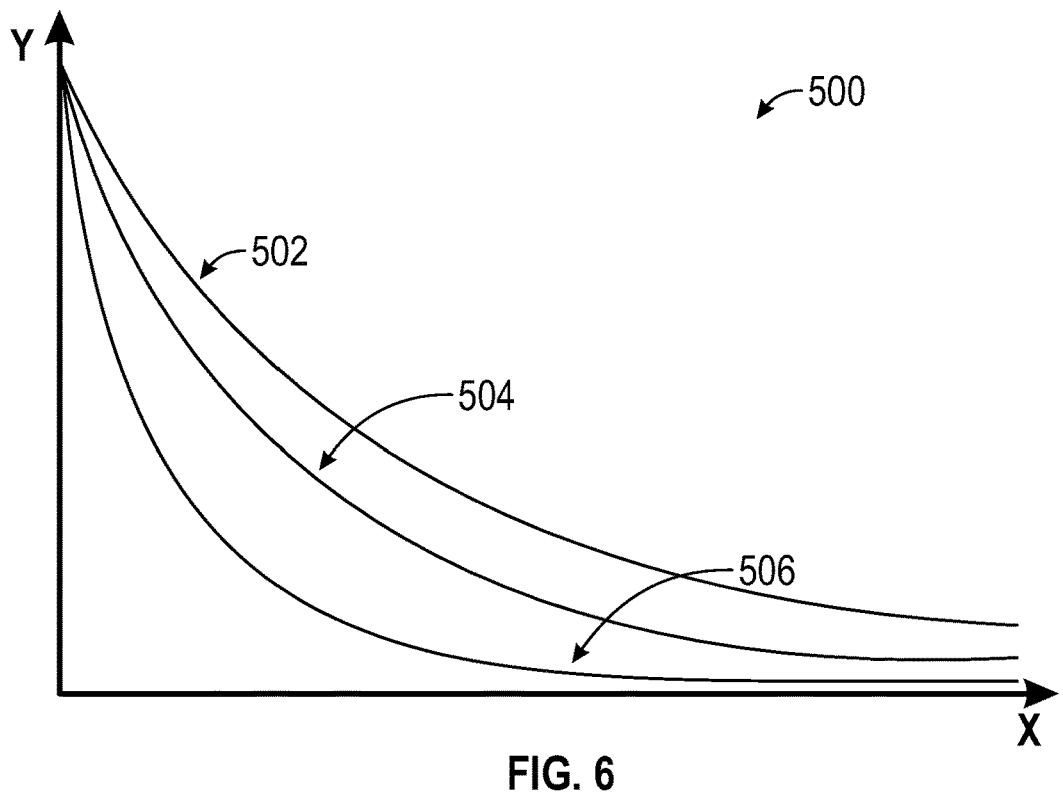
FIG. 6 is a schematic diagram of respective modulation transfer functions for a plurality of intraocular lenses.

Referring now to FIG. 6, a set 500 of modulation transfer functions is schematically shown. The modulation transfer function is formally defined as the magnitude (absolute value) of the complex optical transfer function, which specifies how different spatial frequencies are handled by an optical system. Traces 502, 504 and 506 in FIG. 6 respectively illustrate modulation transfer functions obtained for three different intraocular lenses. The Y axis in FIG. 6 represents the transfer function (magnitude of transmission of an incident radiation) while the X axis represents spatial frequency.

Referring now to FIG. 4, a second implementation 300 of the ray tracing module 26 is shown in accordance with a second embodiment. FIG. 4 shows a bundle of rays 302 propagating through a pseudophakic eye model 330. The second implementation 300 is described with reference to sub-blocks 152, 154, 156 (of block 140) of FIG. 2.

Per sub-block 152, the bundle of rays 302 (see first portion 302A) originates at a spot 306 on the fovea 308 of the retina 310 with a specific divergence 312 that sufficiently illuminates the pupil 346 of the eye E. The fovea 308 is a depression in the inner retinal surface, about 1.5 mm wide. The fovea 308 has a photoreceptor layer that is entirely composed of cones and is specialized for maximum visual acuity. The spot 306 may be infinitesimally small. Per sub-block 154, the bundle of rays 302 (see second portion 302B) propagates anteriorly through the intraocular lens 342 until exiting the anterior corneal surface 354A and the posterior corneal surface 354B.

Per sub-block 156, the controller C is configured to determine a respective metric for the plurality of intraocular lenses 16 based on a spatial distribution of the bundle of rays 302 (see third portion 302C) after exiting the anterior corneal surface 354A. As noted above, the respective metric may be a single parameter, a distribution and may include a wavefront distribution, a modulation transfer function (MTF) and a point spread function (PSF). The ray tracing module 26 of FIG. 1 is configured to simulate a wavefront measurement by an aberrometer device 314, such as a Hartmann-Shack aberrometer (see FIG. 4). The wavefront measurement analyzes the direction and slope of the bundle of rays 302 exiting the anterior corneal surface 354A after a small virtual light source is created on the retina 310 by a virtual laser beam at the spot 306, from where the bundle of rays 302 originate. The respective wavefronts for each of the plurality of intraocular lenses 16 may be converted to a set 400 (shown in FIG. 5) of respective point spread functions by Fourier transformation. In an idealized eye, the wavefront that leaves the anterior corneal surface 354A would be a flat wavefront, i.e., the bundle of rays 302 exiting the anterior corneal surface 354A would be perfectly parallel to the optical axis O and have an infinitesimally small point spread function. In a non-idealized eye, the bundle of rays 302 exiting the anterior corneal surface 354A would not be perfectly parallel to the optical axis O. The ray tracing may be repeated for different diameters of the pupil 346.

Per block 160, the controller C is configured to select the preferred intraocular lens 12 for implantation that fits best the desired visual quality of the subject 14 based in part on a comparison of the respective metrics obtained in sub-blocks 146 and 156 of block 140 above. For example, the trace in the set 400 (see FIG. 5) representing the smallest width of the point spread function may be selected as the preferred intraocular lens 12.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a plurality of files in a file system, an application database in a proprietary format, a relational database management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for identifying a preferred intraocular lens for implantation into an eye, the system comprising:
   a controller having a processor and a tangible, non-transitory memory on which instructions are recorded;
   an ophthalmic imaging system in communication with the controller and adapted to store pre-operative anatomic data of the eye as an eye model, the ophthalmic imaging system including at least one of a topography device or an optical coherence tomography (OCT) device;

wherein the controller includes a projection module selectively executable by the controller and adapted to determine respective imputed post-operative variables of the eye based in part on the pre-operative anatomic data;

wherein the controller includes a ray tracing module selectively executable by the controller and adapted to calculate a propagation of light through the eye; and wherein the controller is configured to:
obtain the pre-operative anatomic data of the eye, via the topography device or the OCT device;
determine the respective imputed post-operative variables for each of a plurality of intraocular lenses, via the projection module;
generate a respective pseudophakic eye model for each of the plurality of intraocular lenses by incorporating the respective imputed post-operative variables into the eye model;
execute the ray tracing module in the respective pseudophakic eye model to determine at least one respective metric for the plurality of intraocular lenses, comprising:
originating a bundle of rays at a spot on a fovea of the eye;
propagating the bundle of rays anteriorly through the eye until the bundle of rays exit an anterior corneal surface;
obtaining the respective metric based on a spatial distribution of the bundle of rays after exiting the anterior corneal surface, including a wavefront of rays exiting the anterior corneal surface; and
repeating the originating, propagating, and obtaining operations for a different pupil diameter and a same intraocular lens of the plurality of intraocular lenses;
select the preferred intraocular lens from the plurality of intraocular lenses based in part on a comparison of the at least one respective metric, the at least one respective metric including a wavefront distribution including flatness of the wavefront of rays exiting the anterior corneal surface, a modulation transfer function (MTF), or a point spread function (PSF); and
outputting a recommendation of the preferred intraocular lens for optimizing visual performance.

2. The system of claim 1, wherein executing the ray tracing module includes:
propagating a bundle of rays posteriorly through the eye until the bundle of rays reach a spot on a retina, the bundle of rays being parallel to an optical axis of the eye prior to entering the eye from an anterior corneal surface; and
obtaining the at least one respective metric based on a spatial distribution of the bundle of rays at the spot on the retina.

3. The system of claim 1, wherein:
the ray tracing module is adapted to employ respective refractive indices in the eye applicable to a wavelength of 550 nanometers of light.

4. The system of claim 1, wherein:
the ray tracing module is adapted to employ respective refractive indices in the eye applicable to multiple wavelengths spanning a visible portion of the spectrum.

5. The system of claim 1, wherein:
the pre-operative anatomic data includes an axial length of the eye.

6. The system of claim 1, wherein:
the pre-operative anatomic data includes a respective location and a respective profile of an anterior corneal surface and a posterior corneal surface of the eye.

7. The system of claim 1, wherein:
the pre-operative anatomic data includes a location, an orientation, and a size of a pupil of the eye in a three-dimensional coordinate system, the pupil being under photopic conditions.

8. The system of claim 1, wherein:
the respective imputed post-operative variables of the eye include a respective location and a respective orientation of the plurality of intraocular lenses.

9. The system of claim 1, wherein:
the at least one respective metric is the point spread function.

10. The system of claim 1, wherein:
the at least one respective metric is the modulation transfer function.

11. A method of identifying a preferred intraocular lens for implantation in an eye the method comprising:
obtaining, via at least one of a topography device or an optical coherence tomography (OCT) device, pre-operative anatomic data of the eye and storing the pre-operative anatomic data as an eye model;
determining respective imputed post-operative variables for each of a plurality of intraocular lenses based in part on the pre-operative anatomic data, via a projection module operating on a controller, the controller including a processor and a tangible, non-transitory memory;
generating a respective pseudophakic eye model for each of the plurality of intraocular lenses by incorporating the respective imputed post-operative variables into the eye model, via the controller;
adapting a ray tracing module to calculate a propagation of light through the eye, the ray tracing module being selectively executable by the controller;
executing the ray tracing module in the respective pseudophakic eye model to determine at least one respective metric for the plurality of intraocular lenses, comprising:
originating a bundle of rays at a spot on a fovea of the eye;
propagating the bundle of rays anteriorly through the eye until the bundle of rays exit an anterior corneal surface;
obtaining at least one respective metric based on a spatial distribution of the bundle of rays after exiting the anterior corneal surface, the at least one respective metric including a wavefront of rays exiting the anterior corneal surface; and
repeating the originating, the propagating, and the obtaining operations for a different pupil diameter and a same intraocular lens of the plurality of intraocular lenses;
selecting the preferred intraocular lens from the plurality of intraocular lenses based at least partially on a comparison of the at least one respective metric, the at least one respective metric including a wavefront distribution including flatness of the wavefront of rays exiting the anterior corneal surface, a modulation transfer function (MTF), or a point spread function (PSF); and outputting a recommendation of the preferred intraocular lens for optimizing visual performance.

12. The method of claim 11, wherein executing the ray tracing module includes:
propagating a bundle of rays posteriorly through the eye until the bundle of rays reach a spot on a retina, the bundle of rays being parallel to an optical axis of the eye prior to entering the eye from an anterior corneal surface; and
obtaining the respective metric based on a spatial distribution of the bundle of rays at the spot on the retina.

13. The method of claim 11, further comprising:
using respective refractive indices applicable to a wavelength of 550 nanometers of light in the ray tracing module.

14. The method of claim 11, wherein:
the pre-operative anatomic data includes an axial length of the eye, and a respective location and a respective profile of an anterior corneal surface and a posterior corneal surface of the eye.

15. The method of claim 11, wherein:
the pre-operative anatomic data includes a location, an orientation, and a size of a pupil of the eye in a three-dimensional coordinate method, the pupil being under photopic conditions.

16. The method of claim 11, further comprising:
selecting the at least one respective metric to be at least one of the point spread function and the modulation transfer function.

* * * * *